(12) United States Patent
Durie et al.

(10) Patent No.: US 9,903,228 B2
(45) Date of Patent: Feb. 27, 2018

(54) COMPOSITE CASING FOR A COMPRESSOR OF AN AXIAL-FLOW TURBOMACHINE

(71) Applicant: Techspace Aero S.A., Herstal (Milmort) (BE)

(72) Inventors: Angela Durie, Knokke-Heist (BE); Alain Derclaye, Couthuin (BE)

(73) Assignee: Safran Aero Booster SA (BE)

( * ) Notice: Subject to any disclaimer, the term of this patent is extended or adjusted under 35 U.S.C. 154(b) by 355 days.

(21) Appl. No.: 14/683,399

(22) Filed: Apr. 10, 2015

(65) Prior Publication Data
US 2015/0292361 A1 Oct. 15, 2015

(30) Foreign Application Priority Data
Apr. 10, 2014 (EP) .................................. 14164291

(51) Int. Cl.
*F01D 25/24* (2006.01)
*F01D 21/04* (2006.01)
(Continued)

(52) U.S. Cl.
CPC ............ *F01D 25/24* (2013.01); *B29C 70/207* (2013.01); *B29C 70/222* (2013.01); (Continued)

(58) Field of Classification Search
CPC ...... F01D 25/24; F04D 29/522; F04D 29/526; F05D 2300/603; F05D 2300/6034; B29C 70/207; B29C 70/222
See application file for complete search history.

(56) References Cited

U.S. PATENT DOCUMENTS

| | | | | |
|---|---|---|---|---|
| 7,018,168 B2 * | 3/2006 | Worthoff | ............... | F01D 21/045 415/9 |
| 7,905,972 B2 * | 3/2011 | Xie | .......................... | B29C 70/22 156/189 |

(Continued)

FOREIGN PATENT DOCUMENTS

EP          1584797 A2      10/2005

OTHER PUBLICATIONS

Solaimurugan, S. et al., Influence of fibre orientation and stacking sequence on petalling of glass/polyester composite cylindrical shells under axial compression, International Journal of Solids and Structures vol. 44, Issue 21, Oct. 15, 2007, pp. 6999-7020.*

(Continued)

*Primary Examiner* — Igor Kershteyn
*Assistant Examiner* — Brian P Wolcott
(74) *Attorney, Agent, or Firm* — Polster Lieder

(57) ABSTRACT

A composite external casing for a compressor of an axial-flow turbomachine, the casing comprising a generally circular wall having a matrix and a woven fibrous reinforcement. The latter is formed by a stack of fibrous plies having fibers woven according to a weft positioned in the axis of the circular wall, and a warp positioned around the circumference of the wall. The stack of plies comprising, depending on thickness, two external layers and one central layer. The layers include differences in the proportions between the weft fibers and the warp fibers. In the external layers the warp fibers make up the majority. In the central layer the weft fibers make up the majority. The stack exhibits interlayers inserted between the central layer and each external layer. The plies corresponding to the interlayers exhibit fibers woven at +45° and −45° in relation to the axis of rotation of the turbomachine.

20 Claims, 3 Drawing Sheets

(51) Int. Cl.
*F04D 29/02* (2006.01)
*F04D 29/52* (2006.01)
*B29C 70/20* (2006.01)
*B29C 70/22* (2006.01)
*F02C 7/04* (2006.01)

(52) U.S. Cl.
CPC .............. *F01D 21/045* (2013.01); *F02C 7/04* (2013.01); *F04D 29/023* (2013.01); *F04D 29/522* (2013.01); *F04D 29/526* (2013.01); *F05D 2300/6034* (2013.01); *Y02T 50/672* (2013.01)

(56) References Cited

U.S. PATENT DOCUMENTS

| | | | |
|---|---|---|---|
| 9,140,140 B2* | 9/2015 | McMillan | F01D 25/243 |
| 2010/0150706 A1* | 6/2010 | Xie | B29C 70/88 |
| | | | 415/200 |
| 2012/0270006 A1 | 10/2012 | McMillan | |
| 2014/0003923 A1* | 1/2014 | Finnigan | F01D 21/045 |
| | | | 415/182.1 |

OTHER PUBLICATIONS

European Search Report from corresponding European Application No. EP 14164291, dated Oct. 2, 2014.

\* cited by examiner

FIG 5
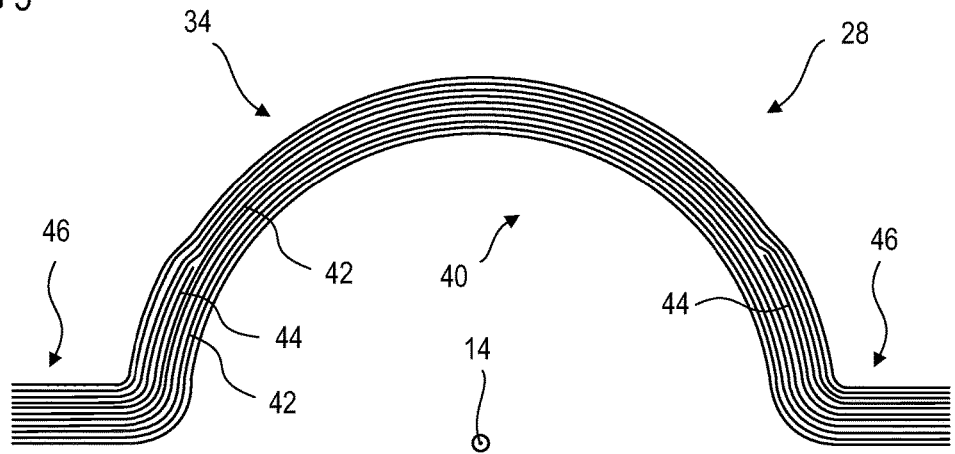
FIG 6
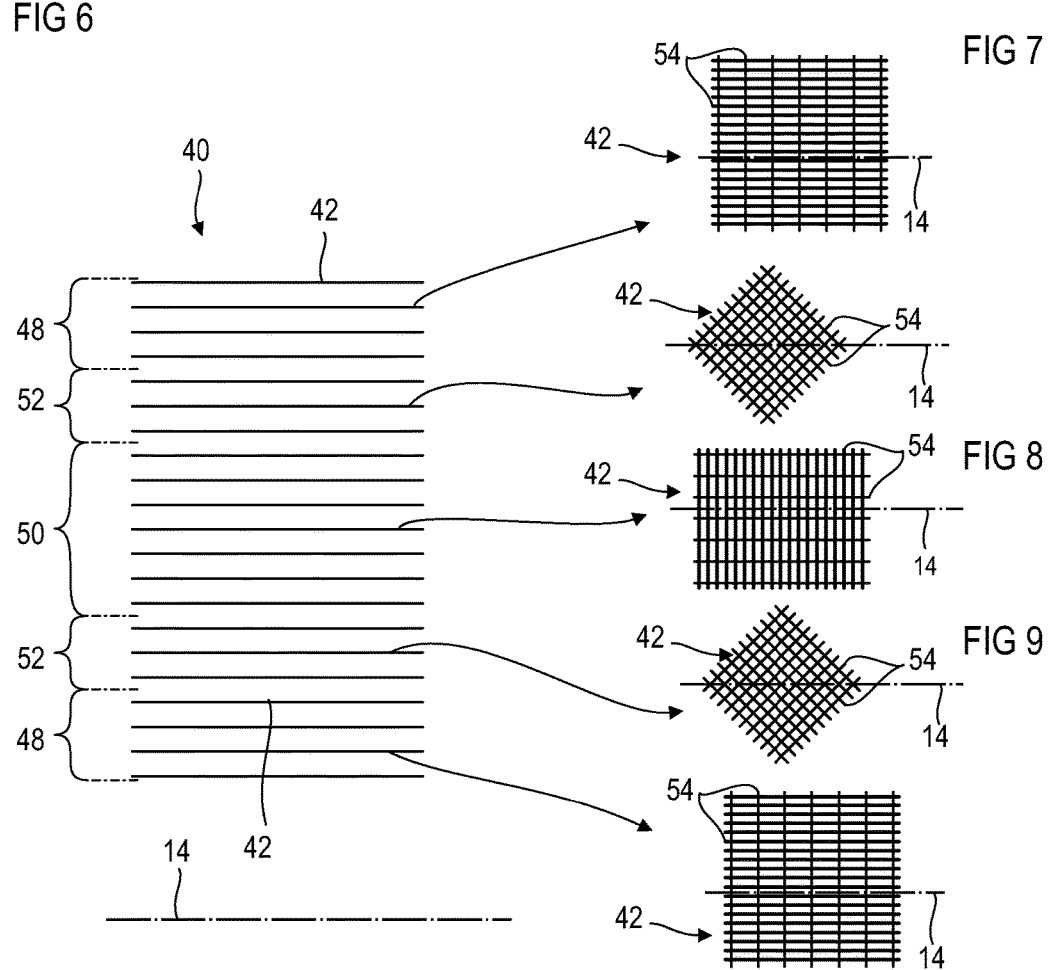
FIG 7
FIG 8
FIG 9

COMPOSITE CASING FOR A COMPRESSOR OF AN AXIAL-FLOW TURBOMACHINE

CROSS-REFERENCE TO RELATED APPLICATIONS

This application claims the benefit, under 35 U.S.C. § 119, of EP 14164291.8, filed Apr. 10, 2014, the disclosure of which is incorporated herein by reference in its entirety.

FIELD

The invention relates to a composite casing for an axial-flow turbomachine. More particularly, the invention relates to a composite casing for a turbomachine comprising a matrix and a reinforcement having fibrous plies. The invention also relates to a turbomachine having a composite casing.

BACKGROUND

The statements in this section merely provide background information related to the present disclosure and cannot constitute prior art.

The use of composite materials is already familiar with a view to lightening a turbomachine, in particular for an aircraft. Such materials are used to produce blades and annular casings. The latter generally comprise an essentially fine wall, which permits a flow to be delimited and guided inside the turbomachine.

Such a composite wall generally comprises an organic matrix and a fibrous reinforcement that is densified by the matrix. The fibrous reinforcement can comprise a preform that is woven in a three-dimensional manner, and/or can comprise a stack of woven fibrous plies.

Such a casing is known from document US2012/0270006 A1. This document discloses a composite casing having a tubular wall produced from a composite material. The composite material exhibits a matrix and a stack of plies having fibers arranged in two perpendicular directions. The orientation of the plies is adapted depending on the thickness of the tubular wall, in such a way as to prioritize particular orientations of fibers at certain positions on the wall. This arrangement of fibers enables the mechanical resistance of the casing to be improved, in particular in the area of the annular mounting flange.

This approach optimizes the resistance of the composite casing. Its rigidity remains low, however, and it can become insufficient in the case of external compressor casings, since these casings are subjected to high loadings. In the event of the loss of a fan blade, the turbomachine exhibits major amplitudes of vibration, and certain of the rotor blades of the compressor can come into contact with the composite casing. The latter is then highly stressed. It should also be noted that the thermal loads and the humidity lower the mechanical resistance of the casing.

SUMMARY

The invention relates to a composite casing for an axial-flow turbomachine, in particular for a compressor, the casing comprising a generally circular wall having a matrix and a woven fibrous reinforcement, the fibrous reinforcement exhibiting, depending on its thickness, two external layers and a central layer positioned between the external layers, the layers comprising fibers extending generally in the axial direction of the circular wall, and fibers extending generally around the circumference of the circular wall, wherein at least one of the external layers comprises a difference in proportion between the axial fibers and the circumferential fibers, the axial fibers making up the majority.

According to various advantageous embodiments of the invention, the central layer comprises a difference in proportion between the axial fibers and the circumferential fibers, the circumferential fibers making up the majority.

According to various advantageous embodiments of the invention, the middle of the thickness of the fibrous reinforcement is situated in the central layer, each layer representing at least 10%, and preferably at least 20%, of the fibrous reinforcement.

According to various advantageous embodiments of the invention, the fibrous reinforcement comprises two interlayers, each being positioned between the central layer and one of the external layers.

According to various advantageous embodiments of the invention, the interlayers comprise woven helicoidal fibers in directions that are generally perpendicular and are inclined at 45° in relation to the circumference of the wall.

According to various advantageous embodiments of the invention, on the majority of the surface of the wall, the fibrous reinforcement exhibits a symmetry in the arrangement of the fibers and/or a symmetry in the proportion of fibers depending on the thickness of the wall and in relation to the middle of the thickness of the wall.

According to various advantageous embodiments of the invention, the fibrous reinforcement comprises a stack of woven fibrous plies, at least one of the plies being woven in such a way as to be preformed according to the form of the wall, and the majority of the woven plies extending for the whole of the axial length of the wall.

According to various advantageous embodiments of the invention, each layer comprises a majority of identical fibrous plies, of which the directions of the fibers making up the majority are in alignment.

According to various advantageous embodiments of the invention, the plies forming the limits of the layers exhibit orientations of fibers in parallel and directions of fibers making up the majority that are in alignment, the plies possibly being identical.

According to various advantageous embodiments of the invention, the fibers of the plies are arranged in woven strands, the strands being woven in a direction of weft and a direction of warp, the weft strands being positioned along the axis of the turbomachine, and the warp strands being positioned around the circumference of the wall. In various embodiments at least one of the external layers comprising between 65% and 85% of the axial fibers, and/or the central layer comprising between 65% and 85% of the circumferential fibers.

According to various advantageous embodiments of the invention, the wall exhibits a minimum diameter DM at one of its axial extremities, the stack comprising additional plies interlayered in the area of the minimum diameter DM, between plies extending axially for the whole of the axial length of the wall.

According to various advantageous embodiments of the invention, the stack comprises from 4 to 40 plies having fibers of the same nature, e.g., from 10 to 20 plies, e.g., from 12 to 16 plies. In various embodiments, each layer can comprise at least two woven plies.

According to various advantageous embodiments of the invention, the wall comprises a plurality of annular rows of attachment holes for stator blades, the annular rows of holes being distributed axially along the wall.

According to various advantageous embodiments of the invention, the casing comprises at least one, e.g., at least two, annular flanges extending radially and axially delimiting the wall, each annular flange being formed by means of the fibrous reinforcement.

According to various advantageous embodiments of the invention, the majority of fibers is a majority of the number of fibers, or the majority of fibers is a majority of the mass.

According to various advantageous embodiments of the invention, between 15% and 35% of the fibers of the plies positioned in the central layer extend along the axial direction of the circular wall, and/or between 15% and 35% of the fibers of the plies positioned in at least one of the external layers extend around the circumference of the wall.

According to various advantageous embodiments of the invention, the annular wall is formed by two half-shells, each half-shell comprising a stack of fibrous plies.

According to various advantageous embodiments of the invention, the fibers of each layer are of the same nature.

According to various advantageous embodiments of the invention, the stack is generally homogeneous around the circumferential direction of the wall.

According to various advantageous embodiments of the invention, the majority of the woven plies form each annular flange and/or each axial flange.

According to various advantageous embodiments of the invention, the stack exhibits a symmetry in the type of plies and/or in the orientation of the fibers and/or in the proportion of the fibers depending on the thickness of the wall and in relation to the middle of the thickness of the wall.

According to various advantageous embodiments of the invention, the wall comprises at least one, e.g., a plurality of, annular zones for receiving stator blades, each annular zone can comprise a means of attachment describing circles. The means of attachment can be hooks or any appropriate means.

According to various advantageous embodiments of the invention, the external layers and/or the central layer comprise plies that are lighter than the plies of the interlayers. The mass is a surface mass.

The invention also relates to a composite casing for an axial-flow turbomachine, in particular for a compressor, the casing comprising a generally circular wall having a matrix and a stack of woven fibrous plies, the stack of plies exhibiting, depending on its thickness, two external layers and one central layer positioned between the external layers, the layers comprising fibers generally extending in the axial direction of the circular wall, and fibers generally extending around the circumference of the circular wall, wherein at least one of the external layers comprises a difference in proportion between the axial fibers and the circumferential fibers of its plies, the axial fibers making up the majority.

The invention also relates to an axial-flow turbomachine comprising a composite casing, wherein the composite casing is consistent with the invention, and in that the composite casing is formed by two half-casings, each comprising axial flanges allowing the joining of the half-casings, the axial flanges being formed by means of the stack of woven fibrous plies.

According to various advantageous embodiments of the invention, the lay-up exhibits at least three or at least four orientation changes of the fibrous yarns between adjacent fibrous layers, and/or at least three or at least four proportion changes of the fibrous yarns between adjacent fibrous layers.

According to various advantageous embodiments of the invention, the fixation flange axially delimits the wall, and comprises through holes distributed around, the turbojet engine comprises fixation elements extending through the through holes of the fixation flange and which are secured to the at least one annular flange which extends radially, and which are secured to the fan hub frame.

The invention makes it possible to optimize the mechanical resistance of a composite casing. The proportions of fibers vary according to the thickness, depending on the amplitude of the deformations to which the fibers are exposed, and depending on the resistance that they can contribute due to their orientations.

In order to modify the proportions of the fibers, the plies are reinforced in one direction and are possibly lightened in one direction or in the other directions. The plies can be reinforced in the warp: plies known as "heavy warp", or reinforced in the weft: plies known as "heavy weft".

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 5 is a sketch of a cross section of the stack of fibrous plies according to the axis 5-5 outlined in FIG. 3, in accordance with various embodiments of the invention.

FIG. 6 illustrates the different layers of the stack of plies, in accordance with various embodiments of the invention.

FIG. 7 illustrates the distribution and the orientation of the fibers of a woven ply of one of the external layers, the woven ply being seen in plan view, in accordance with various embodiments of the invention.

FIG. 8 illustrates the distribution and the orientation of the fibers of a woven ply of the central layer, the woven ply being seen in plan view, in accordance with various embodiments of the invention.

FIG. 9 illustrates the distribution and the orientation of the fibers of a woven ply of one of the interlayers, the woven ply being seen in plan view, in accordance with various embodiments of the invention.

Corresponding reference numerals indicate corresponding parts throughout the several views of drawings.

DETAILED DESCRIPTION

Figure 1:
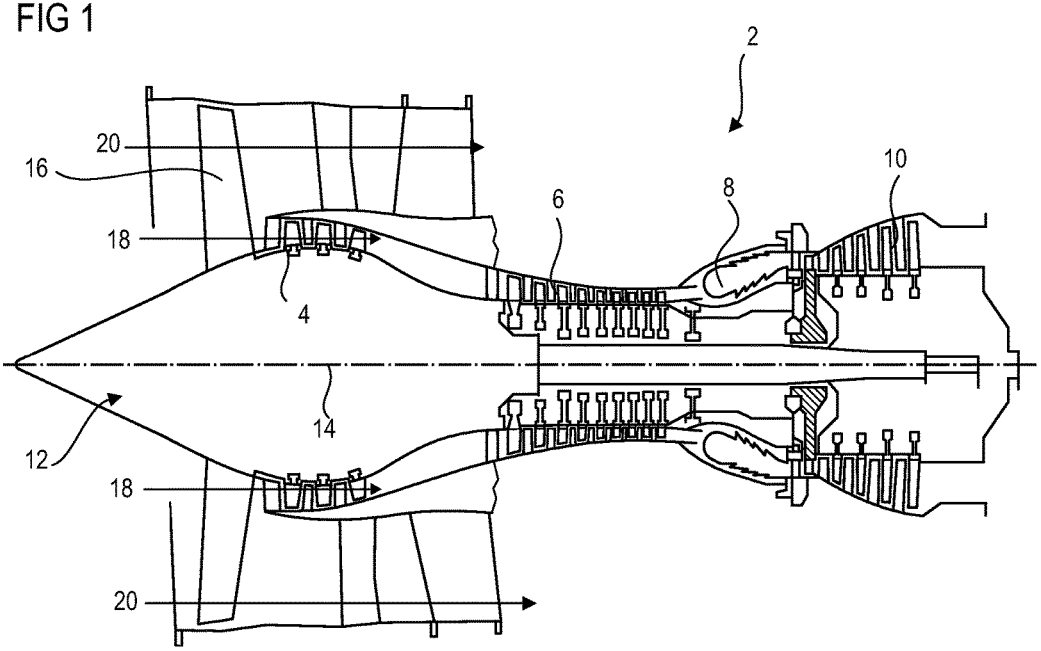
FIG. 1 depicts an axial-flow turbomachine according to various embodiment of the invention.

The following description is merely exemplary in nature and is in no way intended to limit the present teachings, application, or uses. Throughout this specification, like reference numerals will be used to refer to like elements.

In the following description, the expressions interior and exterior refer to a position in relation to the axis of rotation of an axial-flow turbomachine. The axial direction is according to the axis of rotation, and the radial direction is perpendicular to the axial direction.

FIG. 1 is a simplified representation of an axial-flow turbomachine. In this particular case, it is a turbofan engine. The turbofan engine 2 comprises a first level of compression, known as the low-pressure compressor 4, a second level of compression, known as the high-pressure compressor 6, a combustion chamber 8 and one or a plurality of turbine levels 10. In operation, the mechanical power of the turbine 10 transmitted via the central shaft as far as the rotor 12 sets the two compressors 4 and 6 in motion.

The compressors include a plurality of rows of rotor blades associated with rows of stator blades. The rotation of the rotor about its axis of rotation 14 thus makes it possible to generate an air flow and to compress the latter progressively as far as the inlet into the combustion chamber 10.

An inlet ventilator commonly referred to as a fan or blower 16 is connected to the rotor 12 and produces a flow of air which is divided into a primary flow 18 passing through the different above-mentioned levels of the turbomachine, and a secondary flow 20 passing through an annular duct (depicted partially) along the machine before subsequently rejoining the primary flow at the outlet from the turbine. The primary flow 18 and the secondary flow 20 are annular flows, and they are channeled by means of cylindrical partitions, or shells, which can be interior and/or exterior.

Figure 2:
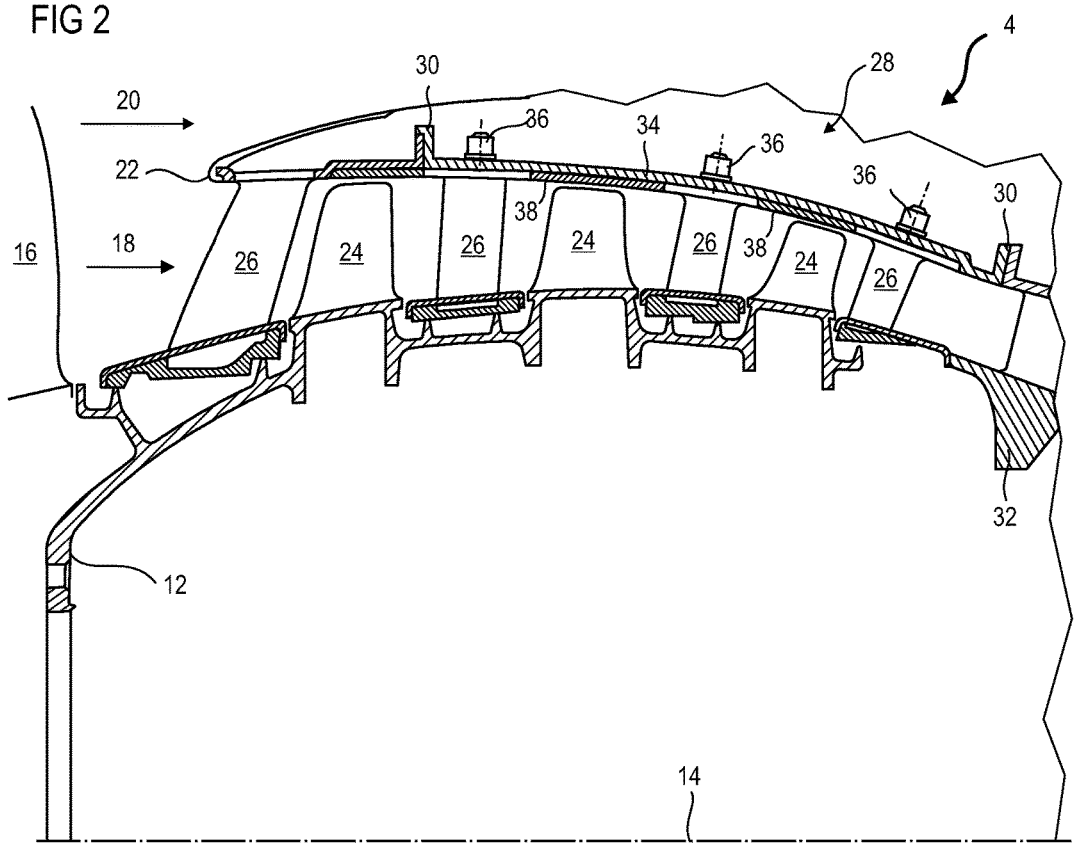
FIG. 2 is a diagram of a compressor of a turbomachine according to various embodiments of the invention.

FIG. 2 is a view in cross section of a compressor of an axial-flow turbomachine such as that depicted in FIG. 1. The compressor can be a low-pressure compressor 4. A part of the fan 16 as well as the lip 22 for the separation of the primary flow 18 and of the secondary flow 20 can be observed here. The rotor 12 can comprise a plurality of rows of rotor blades 24, being three in this particular case.

The low-pressure compressor 4 can comprise at least one rectifier, and in various embodiments, a plurality of rectifiers, e.g., four in this particular case, each of which contains an annular row of stator blades 26. Each rectifier is associated with the fan 16 or with a row of rotor blades 24 in order to rectify the flow of air, in such a way as to convert the flow velocity into pressure.

The compressor comprises at least one casing 28. The casing 28 can exhibit a generally circular or tubular form. The casing can be an external compressor casing and it can be made of composite materials, which makes it possible to reduce its mass while optimizing its rigidity. The casing 28 can comprise mounting flanges 30, for example annular mounting flanges 30, for the attachment of the separation lip 22 and/or for attachment to a spacer casing 32 for a fan of the turbomachine. The composite casing then assures the function of a mechanical link between the separation lip 22 and the spacer casing 32. The casing likewise assures the function of centring of the separation lip 22 in relation to the spacer casing, for example by means of its annular flanges. The annular flanges 30 can be made of a composite material and can comprise attachment holes (not depicted here) in order to permit their attachment by bolts, or by lock bolts. The flanges 30 can comprise centring surfaces, such as centring orifices.

The composite casing 28 can comprise a wall 34 that is generally circular or in the arc of a circle, the edges of which can be delimited by the flanges 30. The wall 34 can exhibit a revolution profile about the axis of rotation 14. The wall 34 can be made of a composite material, having a matrix and a reinforcement. The wall 34 can exhibit a shape in the form of an arch, with a variation in its radius along the axis 14. This change in the radius can be inverted, and the minimum diameter can be downstream. The wall 34 exhibits an interior surface having a double curvature. The axial length of the wall 34 can represent the majority of the minimum radius of the interior surface of the wall, its axial length possibly being greater than or equal to the minimum radius of the interior surface of the wall 34. The axial length is measured according to the axis of rotation 14.

The stator blades 26 extend essentially radially from the wall 34, in the area of annular zones for receiving blades. These zones can comprise means of attachment such as annular throats, or attachment holes. Advantageously, the orifices are arranged in annular rows. The latter can be distributed axially along the wall 34. The blades 26 can be secured here in an individual manner, or can form segments of blades secured to the wall 34.

The stator blades 26 can comprise platforms, possibly provided with attachment pins 36 such as lock bolts, threaded rods or any other equivalent means. In operation, the stator blades 26 are subjected to the flow forces of the airflow. These forces can be absorbed solely by the wall 34, in addition to the own weight of each blade. This configuration signifies that the wall 34 can be subjected to the application of forces in circles, the forces being variable given that the flow varies during the operation of the turbomachine. The irregularity of the forces encourages the emergence of compound and complex modes of deformation.

The wall 34 can likewise serve to support different elements, such as casing arms. The wall can comprise annular layers of abradable material 38 between the platforms of the blades, so as to form a barrier between the primary flow 18 and the wall 34.

The composite casing 28, or at least its wall 34, can be produced by injection. The injection process can involve the impregnation of a fibrous reinforcement with a resin, possibly an organic resin such as epoxy. The impregnation can be according to a procedure of the RTM type (English acronym for Resin Transfer Molding). Furthermore, the composite casing, or at least its wall 34, can be produced by means of woven fabrics that are pre-impregnated with a resin that has been hardened in an autoclave.

The fibrous reinforcement can generally exhibit a symmetry of revolution having a revolution profile in relation to the axis 14. The fibrous reinforcement can comprise a stack or a winding of different fibrous sheets or fibrous plies, or can comprise a preform woven in a three-dimensional manner, known as a monolithic 2.5D or 3D preform. The monolithic preform and/or the fibrous plies can extend on the wall, and on at least one or a plurality of flanges. The stack of fibrous plies can possibly be the fibrous reinforcement, the integrality of the characteristics relating to the fibrous reinforcement being applicable to the stack.

Figure 3:
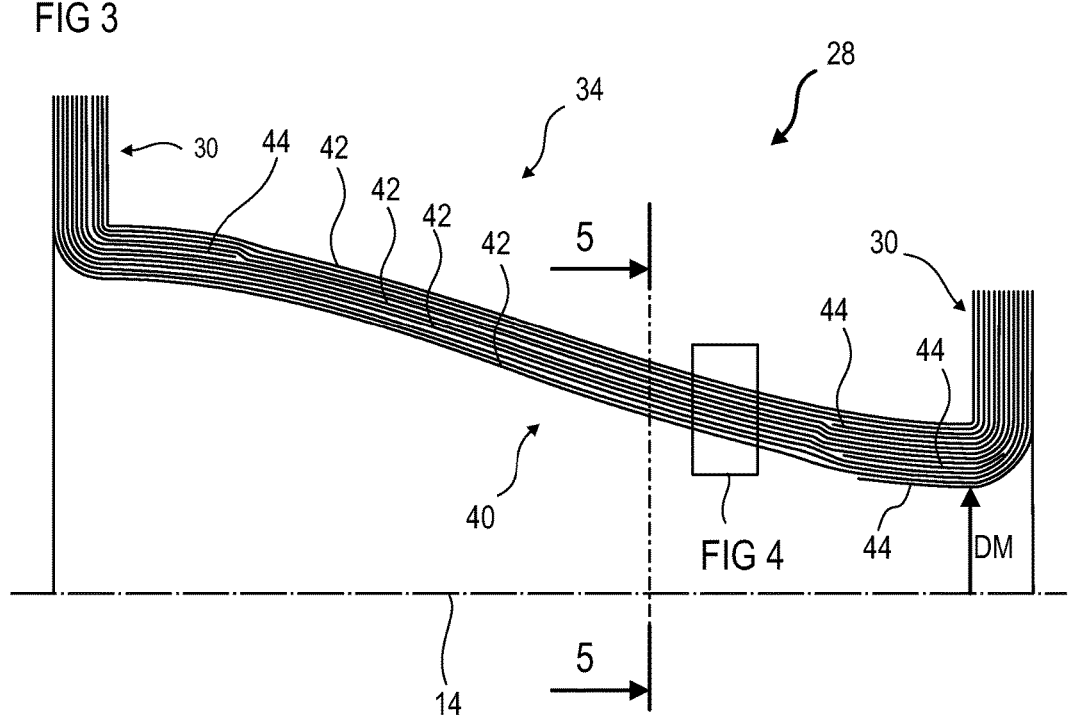
FIG. 3 is a sketch of a cross section of the stack of fibrous plies of the composite casing according to the axis of rotation of the turbomachine, in accordance with various embodiments of the invention.

FIG. 3 depicts a cross section of the fibrous reinforcement of the composite casing 28. The cross section is taken in the axis of rotation 14 of the turbomachine. The present approach can be adopted for any casing of the turbomachine, such as a fan casing.

The plies 42 can be woven. The stack 40 can comprise nonwoven plies. In various embodiments, the majority of the plies of the stack 40 can be woven plies. Each ply 42 can extend for an axial fraction of the wall 34. The number of plies 42 can thus vary axially. The number of plies 42 can increase in the downstream direction. The plies 42 can comprise carbon fibers, and/or graphite fibers, and/or glass fibers and/or Kevlar fibers, and/or carbon titanium fibers.

The fibrous reinforcement, where appropriate in the stack 40, can form at least the annular flange and preferably at least each annular flange 30 of the composite casing. The fibrous reinforcement, or at least a fibrous ply 42, can be joined to each annular flange. The fibrous reinforcement, or the majority of the fibrous plies or all the fibrous plies 42 of the wall 34, can extend into the interior of each annular flange, possibly for the whole of the radial height.

The wall 34 exhibits a minimum diameter DM at one of its axial extremities. The stack 40 can exhibit a maximum number of fibrous plies 42 in the area of the minimum diameter DM. Additional plies 44 are added in such a way as to reinforce the mechanical connection between the wall 34 and the downstream flange 30. Each annular flange 30 can comprise at least one additional ply 44, for example positioned locally. Each or at least one additional ply positioned in an annular flange has an annular shape and extends for the whole of the flange.

Optionally, at least one or each fibrous ply 42 is woven according to the form of the wall 42, and in various embodiments by integrating the form of flanges 30. Each ply 42 can be preformed prior to being stacked, and its form can be adapted at the time of its draping in the stack. The majority of the fibrous plies 42 can extend for the whole of the axial length of the wall 34.

FIG. 5 depicts a cross section of the fibrous reinforcement along the axis 5-5 plotted in FIG. 3.

The composite casing can describe a circle. The casing can be formed by two annular half-casings, each of which describes a half-circle. The annular casing can thus comprise two fibrous reinforcements and/or two stacks 40 forming semi-circles. For the purpose of joining the half-casings together, the latter are provided with axial attachment flanges 46 intended to be secured to each other. The axial flanges border on the half-walls 34.

Each axial flange 46 can be made from a composite material, with the fibrous reinforcement and the matrix. Consequently, each fibrous reinforcement and/or each stack can form radially extending axial flanges. Each axial flange 46 can be reinforced by means of additional plies 44, which likewise extend into the wall 34. The axial additional plies can have the forms of axially extending strips.

The stack 40 can comprise at least one ply 42 which extends into the wall 34 and into each axial flange 46. The majority of the plies 42 or each ply possibly extend(s) into the wall 34 and into each axial flange 46, in various embodiments, for the whole of the surface of each axial flange.

FIG. 6 depicts the fibrous reinforcement of the wall 34, the distribution of the fibers within the layers and the orientation of the fibers within the layers.

Depending on the thickness of the wall 34, generally in the radial direction, the fibrous reinforcement comprises a plurality of distinct, and possibly superposed layers. The layers can be distinguished from one another primarily by means of the orientation of their fibers.

The fibrous reinforcement and/or the stack can exhibit, at least, two external layers 48 and one central layer 50 positioned between the external layers 48. The external layers 48 can be visible from the interior or the exterior of the fibrous reinforcement in the radial direction. They can be the layers that are situated furthest from the center of the thickness of the wall. The middle of the thickness of the fibrous reinforcement can be situated in the central layer 50. Each layer can represent at least 10%, e.g., at least 15%, and in various embodiments at least 20% of the thickness of the fibrous reinforcement. The external layers and the central layer form the majority of the thickness of the fibrous reinforcement.

In various embodiments, the fibrous reinforcement and/or the stack 40 can comprise interlayers 52. The interlayers 52 are positioned to either side of the central layer, in such a way as to separate it from the external layers. Possibly, the interlayers 52 are each in contact with the central layer 50 and with one of the external layers 48.

The majority of the fibers of the fibrous reinforcement can be of the same nature. The majority of the plies of the stack 40 can exhibit fibers of the same nature. In various embodiments, the fibers of the stack 40 are fibers of the same nature, for example carbon fibers. The stack can be a principal stack. The stack can be covered with plies, of which the fibers are made from another material, such as glass fibers, in order to prevent the galvanic corrosion of the composite casing.

The stack can comprise from 4 to 40 woven plies 42, for example, with fibers of the same nature, e.g., from 8 to 30 woven plies 42 with fibers of the same nature, e.g., from 12 to 16 woven plies 42 with fibers of the same nature. Each layer possibly comprises at least two, and in various instances, at least three, woven plies 42. The provision of two similar woven plies in one and the same layer facilitates the nesting of their meshes, which increases the rigidity of the layer.

The woven plies 42 can comprise strands of fibers, or bundles of fibers woven in two directions, for example perpendicular. Each strand of fibers exhibits a plurality of fibers according to its cross section, for example six thousand fibers (6 k), twelve thousand fibers (12 k), or more. Each strand of fibers can be twisted. A fibrous ply can possibly exhibit three directions of weaving.

In the case of the external layers 48 and the central layer 50, each woven ply 42 can be woven by means of warp strands 54 and weft strands, as depicted in FIGS. 7 and 8. The weft strands can be positioned generally according to the axis of rotation 14 of the turbomachine and can comprise the axial fibers, and the warp strands can be positioned generally according to the circumference of the wall and can comprise the circumferential fibers. In the case of a monolithic preform, the different layers can be produced with the same strands.

In the option of the interlayers 52, the fibers can be inclined in relation to the axis of rotation 14 of the turbomachine and, in various instances, can be helicoidal. The interlayered plies of the interlayers can comprise strands 54 that are inclined in relation to the axis of rotation 14 of the turbomachine. As depicted in FIG. 9, the strands can exhibit generally helicoidal forms. The strands 54 and consequently their fibers can be generally inclined by +45° and −45° in relation to the axis of rotation 14, and/or in relation to the circumference of the composite casing. The interlayered plies advantageously exhibit an equilibrium between the fibers in respect of their directions of weaving. Their strands 54 can exhibit the same numbers of fibers. In FIGS. 7, 8 and 9, the strands 54 are shown spaced apart from one another in order to illustrate the difference in the proportion of fibers. As an option, however, the strands can be tightly packed against each other. The difference in the proportion or in the density of the fiber can be obtained by utilizing the strands with more or fewer fibers.

Each layer can comprise a majority of identical plies 42. The majority directions of the fibers in the different plies can possibly be parallel within one and the same layer. The plies 42 forming the limits of each layer can exhibit orientations of parallel fibers, and/or majority directions of identical fibers, and each of the plies can possibly be identical. As a result, each layer can exhibit a homogeneous mechanical behaviour.

On the majority of the surface of the wall, the fibrous reinforcement can exhibit a symmetry of the fibers depending on the thickness of the wall and in relation to the center of the thickness of the wall. The symmetry can relate to the orientations of fibers, and/or the proportions of fibers depending on the orientation, and/or to the majority directions of the fibers. The symmetry can be according to the type of plies. The external layers 48 and/or the interlayers 52 can be reflected two by two in relation to the central layer 50.

In order to increase the rigidity of the wall with regard to a compound deformation, the majority of the fibers, e.g., the woven plies, of the central layer 50 can extend along the circumference of the wall between 55% and 90%, or between 65% and 85% of the fibers, e.g., the fibers of the woven plies, of the central layer 50 can extend along the circumference of the wall. The principal direction of the fibers of the central layer is along the circumference of the casing.

The majority of the fibers, e.g., the woven plies, of at least one of the external layers 48, e.g., of each external layer 48, can extend along the axial direction of the wall. In various embodiments, between 55% and 90%, or between 65% and 85% of the fibers, e.g., the fibers of the woven plies, of at least one, and in various instances of each external layer 48, extends along the axial direction of the wall.

For example, at least one ply 42, or the majority of the plies 42, or each ply 42 of at least one, and in various instances of each external layer 48, include(s) strands of weft having nine thousand fibers, and strands of warp having six thousand fibers. At least one ply, or each ply 42, or the majority of the plies of the central layer 50 can comprise strands of weft having six thousand fibers, and strands of warp having twelve thousand fibers. The different woven strands can generally form sinusoids, and in various instances the sinusoids of the weft strands can be the most pronounced.

Figure 4:
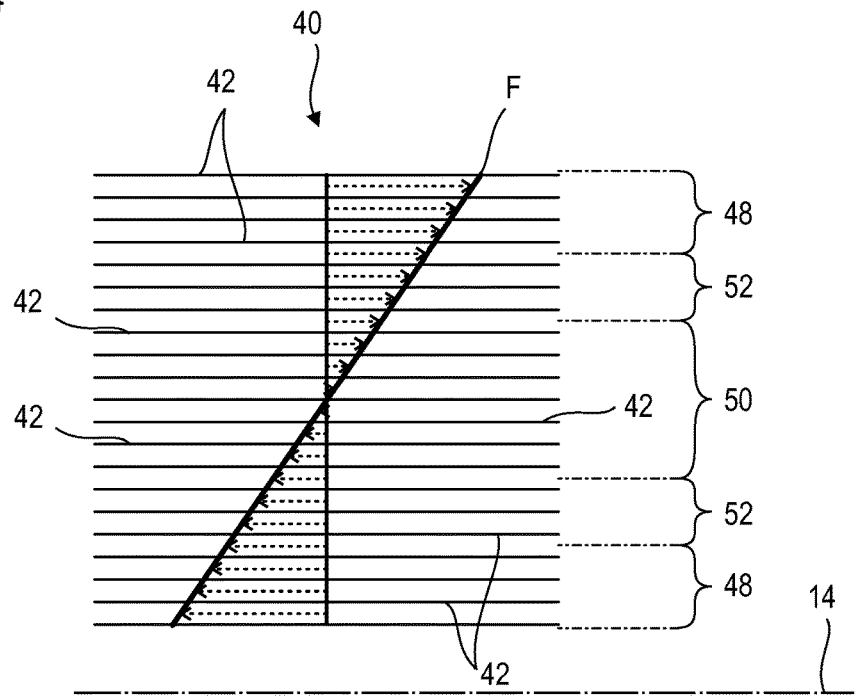
FIG. 4 illustrates the axial deformation of a portion of a composite casing indicated in FIG. 3 at the time of contact with rotor blades, in accordance with various embodiments of the invention.

FIG. 4 illustrates the deformation F under bending of the plies 42 of the layers of the stack 40 in the case of the deformation of the composite casing during contact with rotor blades. The contact can be indirect, via a layer of abradable or brittle material. During such an event, a portion of the casing deforms under bending in a radial direction, by arching in relation to the axis 14.

It should be noted that the axial deformations are at their maximum in the area of the external layers 48, are reduced in the interlayers 52, and are at their minimum in the central layer 50. The axial deformation falls to zero at the center of the central layer 50, and the latter can exhibit a type of surface with zero deformation. The material deforms in compression on one side of this surface, and in traction on the other side. This signifies that the material, the fibers and the matrix are deformed in compression or in traction. In terms of the mechanical design, it can be decided to apply a strength criterion linked to the traction. Increasing the proportion of fibers extending axially makes it possible to reinforce the material and accordingly to increase the allowable axial strain. This measure permits the casing to be reinforced.

During operation or in the event of contact between a blade and the casing, the latter tends to increase in diameter; i.e. to swell. The material of the casing then being subjected to traction depending on its circumference, it is necessary to increase the proportion of circumferential fibers locally in order for them to operate under traction. It is advisable to increase this proportion in the area of the central layer 50, since the latter is not subjected, or is subjected only to a limited extent, to an axial deformation. In the case of the circumferential fibers of the central layer 50 or the axial fibers of each external layer 48, adapting the proportion of fibers according to the directions of weaving presents a double advantage, since this enables the mechanical resistance for a given deformation to be increased, but without increasing the weight of the casing.

In addition to the aforementioned deformations at the time of the contact with the blades, the composite casing is subjected to torsional loading because the blades drive the casing causing it to rotate. The helicoidal fibers of the interlayers 52 exhibit optimal orientations in order to absorb the forces and to prevent the casing from twisting. It is advisable to place the helicoidal fibers in the interlayers, a layer where the axial deformation remains significant, since they are capable of resisting the compression. They contribute in addition to preventing swelling of the casing. Their interlayered positions between the central layer 50 and the external layers 48 allow them to be sleeved. Their fibers can be maintained, compressed, by the neighbouring layers in the event of deformation, which prevents delamination of the corresponding plies.

In addition to these deformations, a casing of a turbomachine is subjected to vibrations during operation of the turbomachine. Their amplitude reaches its maximum value in the event of the loss of a fan blade, as mentioned above. The vibrations bring about a deformation with a plurality of components, including, for example, axial flexure, axial torsion, compression, ovalization. In addition, the annular wall of the casing can exhibit embodiments with diameters and/or a rotating deformation wave depending on its circumference, or moving axially The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A composite casing of an axial-flow turbomachine, said casing comprising:
   a generally circular wall having an organic matrix and a woven fibrous reinforcement, the woven fibrous reinforcement comprising:
   a lay-up with five stacked fibrous layers including two external layers, one central layer positioned between the external layers, two interlayers positioned between the central layer and one of the external layers, wherein each fibrous layer comprises:
   several woven fibrous plies, each woven fibrous ply including woven fibrous yarns arranged in two perpendicular directions;
   the woven fibrous yarns of each stacked fibrous layer being arranged in two same directions;
   wherein, the lay-up includes four orientation changes of the fibrous yarns between adjacent stacked fibrous layers, the external layers including more woven fibrous plies than the interlayers.

2. The composite casing of claim 1, wherein each of the five stacked fibrous layers are homogeneous on a whole axial length of the composite casing and comprises fibers of the same material.

3. The composite casing of claim 1, wherein the lay-up includes seven stacked fibrous layers, each fibrous layer being homogeneous on a whole axial length of the composite casing.

4. The composite casing of claim 1, wherein the interlayers comprise woven helicoidal fibers in directions that are generally perpendicular, and are inclined at approximately 45° in relation to the circumference of the wall.

5. The composite casing of claim 1, wherein the external layers and the central layer each comprise woven fibrous yarns extending axially, and woven fibrous yarns extending circumferentially.

6. The composite casing of claim 1, wherein the generally circular wall exhibits an inner surface with diameter changes, the plies of the lay-up are woven to be preformed according to the form of the generally circular wall, and the majority of the woven plies extend over a whole of the axial length of the generally circular wall.

7. The composite casing of claim 1, wherein on a majority of a surface of the generally circular wall, the fibrous reinforcement exhibits symmetry in an arrangement of the fibers and symmetry in the proportion of fibers based on a radial thickness of the generally circular wall and in relation to a middle of the radial thickness of the generally circular wall.

8. The composite casing of claim 1, wherein the fibrous yarns of the plies form woven strands, the strands being woven in a weft direction and a warp direction, the weft strands being positioned along the axis of the turbomachine, and the warp strands being positioned around the circumference of the generally circular wall.

9. The composite casing of claim 1, wherein the lay-up comprises additional plies interlayered extending axially on less than a half of the casing, each additional ply starting axially from an axial end of the casing.

10. The composite casing of claim 1, wherein the lay-up comprises from 12 to 20 woven plies having fibers of a same material and forming the five stacked fibrous layers.

11. A compressor of an axial-flow turbomachine, said compressor comprising:
a composite casing with a generally circular wall having an organic matrix and a woven fibrous reinforcement, the woven fibrous reinforcement comprising:
five stacked homogeneous layers including two external layers and one central layer positioned between the external layers, the external layers and the central layer comprising:
fibers extending in the axial direction of the circular wall, and fibers extending generally around the circumference of the circular wall, wherein:
the external layers comprise a difference in proportion between the axial fibers and the circumferential fibers, the axial fibers making up a majority, and
the central layer comprises a difference in proportion between the axial fibers and the circumferential fibers, the circumferential fibers making up the majority.

12. The compressor of claim 11, wherein the casing is formed by two half-casings, each comprising two axial flanges to allow joining of the half-casings, each half-casing comprising wall portions adjacent to the axial flanges, the five stacked homogeneous layers extend inside the axial flanges and are the same as in the wall portions.

13. The compressor of claim 11, wherein the woven fibrous reinforcement comprises two interlayers, each being positioned between the central layer and one of the external layers, each interlayer comprising plies with balanced perpendicular fibrous yarns.

14. The compressor of claim 11, wherein a middle of a thickness of the woven fibrous reinforcement is situated in the central layer, the thickness of the central layer representing between 10% and 30% of the woven fibrous reinforcement's thickness.

15. The compressor of claim 11, wherein each layer comprises identical woven fibrous plies having woven directions in alignment.

16. The compressor of claim 11, wherein at least one of:
at least one of the external layers comprises between 65% and 85% of the axial fibers, and
the central layer comprises between 65% and 85% of the circumferential fibers.

17. The compressor of claim 11, wherein the generally circular wall comprises a minimum diameter DM at one of its axial extremities, the five stacked homogeneous layers comprises additional plies interlayered in the area of the minimum diameter DM, between plies extending axially for a whole axial length of the generally circular wall.

18. The compressor of claim 11, wherein the generally circular wall comprises a plurality of annular rows of attachment holes through the woven fibrous reinforcement, and the compressor further comprises several rows of stator blades with fixation portions, each fixation portion extending through its associated hole and being fixedly secured to the associated hole.

19. A turbojet engine, said turbojet engine comprising:
a composite casing with a generally circular wall having a matrix and a woven fibrous reinforcement, the woven fibrous reinforcement comprising:
a lay-up with five stacked fibrous layers including two external layers, one central layer positioned between the external layers, two interlayers positioned between the central layer and one of the external layers, wherein each fibrous layer comprises:
several woven fibrous plies extending axially on a majority of the composite casing, each fibrous ply including woven fibrous yarn arranged in two perpendicular directions;
the woven fibrous yarns of each stacked fibrous layer being arranged in two same directions; wherein, a plurality of the five stacked fibrous layers include plies comprising fibrous woven yarns exhibiting a difference of proportion between the fibrous woven yarns of the plurality of the five stacked fibrous layers;
wherein, the lay-up comprises at least two orientation changes of the woven fibrous yarns of the woven fibrous plies arranged in two perpendicular directions between adjacent stacked fibrous layers, and at least two proportion changes of the fibrous yarns between the adjacent stacked fibrous layers between which the orientations of the fibrous yarns change.

20. The turbojet engine of claim 19, further comprising a fan and a spacer casing for the fan, wherein:
the composite casing comprises an annular fixation flange fixed to the spacer casing,
an axial annular portion of the generally circular wall is adjacent to the annular fixation flange and has the lay-up extending therein, and
the annular fixation flange comprises the same lay-up of stacked fibrous layers as in the axial annular portion of the generally circular wall.

* * * * *